US011249350B2

(12) United States Patent
Huggins

(10) Patent No.: US 11,249,350 B2
(45) Date of Patent: Feb. 15, 2022

(54) LIQUID CRYSTAL CELL ASSEMBLY

(71) Applicant: Flexenable Limited, Cambridge (GB)

(72) Inventor: Jonathan Huggins, Cambridge (GB)

(73) Assignee: Flexenable Limited, Cambridge (GB)

(*) Notice: Subject to any disclaimer, the term of this patent is extended or adjusted under 35 U.S.C. 154(b) by 0 days.

(21) Appl. No.: 17/032,890

(22) Filed: Sep. 25, 2020

(65) Prior Publication Data

US 2021/0096414 A1 Apr. 1, 2021

(30) Foreign Application Priority Data

Sep. 30, 2019 (GB) ..................... 1914072

(51) Int. Cl.
*G02F 1/1341* (2006.01)
*G02F 1/1339* (2006.01)

(52) U.S. Cl.
CPC ........ *G02F 1/13415* (2021.01); *G02F 1/1339* (2013.01); *G02F 1/1341* (2013.01); *G02F 1/13394* (2013.01); *G02F 1/13396* (2021.01)

(58) Field of Classification Search
CPC .............. G02F 1/1341; G02F 1/13415; G02F 1/13394; G02F 1/13396; G02F 1/1339
See application file for complete search history.

(56) References Cited

U.S. PATENT DOCUMENTS

| | | | | |
|---|---|---|---|---|
| 2003/0184704 A1* | 10/2003 | Akiyama | .......... | G02F 1/133305 349/158 |
| 2006/0017877 A1* | 1/2006 | Wu | ........... | G02F 1/1341 349/187 |
| 2006/0023155 A1* | 2/2006 | Magana | .............. | G02F 1/13394 349/154 |
| 2014/0085579 A1* | 3/2014 | Fan | ................... | G02F 1/133351 349/123 |
| 2014/0140366 A1 | 5/2014 | Tamatani et al. | | |
| 2018/0148531 A1* | 5/2018 | Tamatani | .............. | G02F 1/1303 |

OTHER PUBLICATIONS

Search Report from Great Britain Patent Application No. 1914072. 2, dated Mar. 30, 2020.

* cited by examiner

*Primary Examiner* — Jia X Pan
(74) *Attorney, Agent, or Firm* — Dergosits & Noah LLP; Todd A. Noah

(57) ABSTRACT

Method of forming and patterning in situ on a film component of a layer of spacer structure material to define spacer structures in at least active areas of a liquid crystal (LC) cell array. Applying counter component to the film component after dispensing sealant material onto one or more of the components in areas around each active area of the array, and after dispensing one or more drops of LC material onto one or more of the components in each active area of the array. The components are pressed together to spread the drops of LC material over the active areas so the sealant material for each LC cell interfaces with the LC material for the respective LC cell. Each deposition area has an inner perimeter, which is controllably varied across the array to compensate for variations in one or more properties of the spacer structures across the array.

3 Claims, 4 Drawing Sheets

LIQUID CRYSTAL CELL ASSEMBLY

CLAIM OF PRIORITY

This application claims priority to Great Britain Patent Application No. 1914072.2, filed Sep. 30, 2019, the contents of which are incorporated by reference in their entireties.

FIELD OF THE INVENTION

A liquid crystal (LC) cell typically comprises two half-cells defining a cell gap therebetween and liquid crystal material filling the cell gap.

A scattering of pre-prepared spacer elements, such as spacer balls/beads/fibres, between the two half-cells has been used to define a cell gap of precise thickness between the two half-cells in the finished cell; but the use of ordered arrays of spacer structures built into one or both of the half-cells has the advantage of location control. For the example of a pixelated display device, it may be preferred to locate the spacer structures for the active area in black matrix regions between pixel regions.

The inventor for the present application has worked on developing a mass production technique involving processing a wide area plastics film component (mother component) to create a plurality of LC cells from the mother component.

With reference to FIG. 4, the inventor for the present application has observed localised defects in a set of LC cells produced from a single mother component, and has identified a correlation between the occurrence of these defects in a LC cell and the position that was occupied by the LC cell within the mother component from which it was created. The observed defects include (a) bubbles and (b) defects that manifest themselves as colour non-uniformities when viewing the undriven LC cell between polarisers oriented at 45 degrees to one another, and as yellow spots when the LC cell is white-driven between two polarisers oriented at 90 degrees to one another. The inventor for the present application has ascribed the occurrence of these defects to small variations in properties (starting thickness, elasticity) of the spacer structures across the area of the mother component.

There is hereby provided a method, comprising: forming in situ on a film component a layer of spacer structure material, and patterning the layer of spacer structure material in situ on the film component to define spacer structures for an array of liquid crystal (LC) cells in at least the active areas of the LC cells; applying a counter component to the film component, after having dispensed sealant material onto one or more of the two components in respective sealant deposition areas around each active area of the array of LC cells, and after having dispensed one or more drops of LC material onto one or more of the two components in each active area of the array of LC cells; pressing the two components together so as to spread the drops of LC material over the active areas; wherein, after pressing, the sealant material for each LC cell interfaces with the LC material for the respective LC cell; and wherein each of said sealant deposition areas has a respective inner perimeter, and the method further comprises controllably varying said inner perimeter size across the array of LC cells, so as to compensate for variations in one or more properties of the spacer structures across the array of LC cells.

According to one embodiment, the method further comprises: predicting variations in said one or more properties of the spacer structures based on spacer structure measurements in one or more production tests; and wherein controllably varying said inner perimeter size across the array of LC cells is based on said predicted variations.

According to one embodiment, said one or more properties of the spacer structures comprises the height of the spacer structures.

BRIEF DESCRIPTION OF THE FIGURES

An embodiment of the invention is described in detail hereunder, by way of example only, with reference to the accompanying drawings, in which.

DETAILED DESCRIPTION

In one example embodiment, the technique is used for the production of an organic liquid crystal display (OLCD) device, which comprises an organic transistor device (such as an organic thin film transistor (OTFT) device) for the control component. OTFTs comprise an organic semiconductor (such as, e.g., an organic polymer or small-molecule semiconductor) for the semiconductor channels." The technique for the present invention is equally applicable also to the production of LC cells for other kinds of devices, such as adaptive lens devices, etc.

Figure 1:
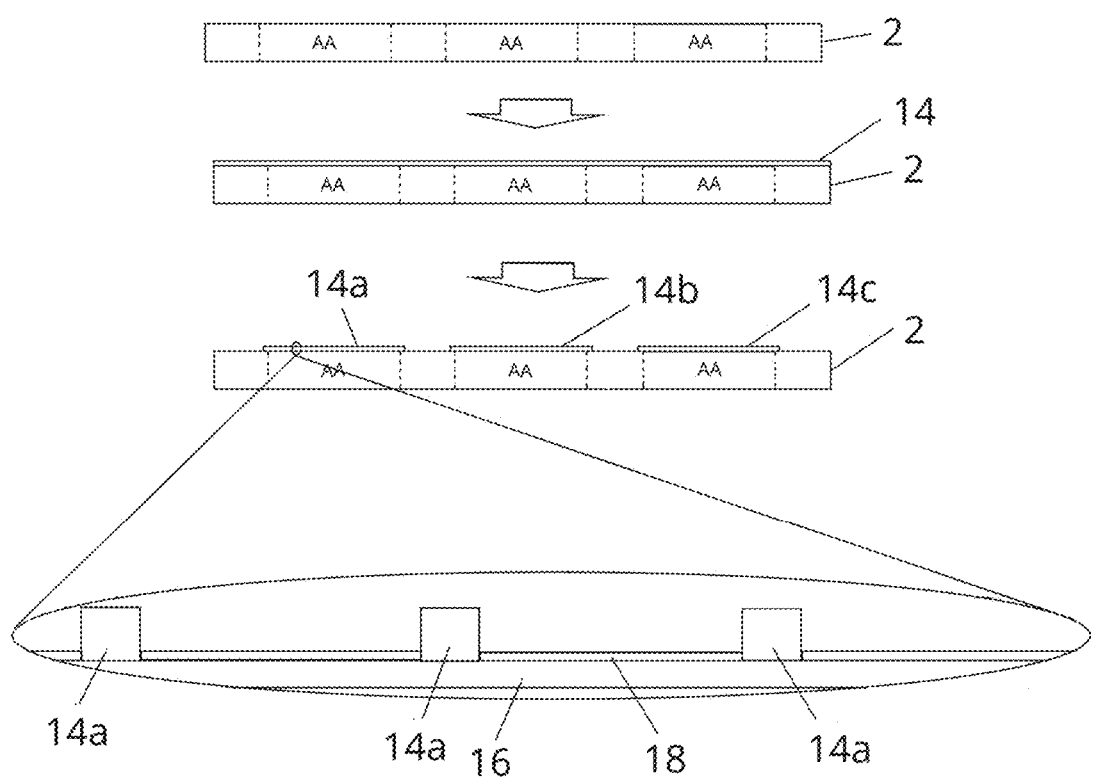
FIG. 1 illustrates two early stages of a method according to an embodiment of the present invention.

With reference to FIG. 1, the description of an example of a method according to an embodiment of the present invention begins with forming a layer of spacer structure material 14 in situ on a wide area film component (mother component) 2. The mother component 2 already includes a wide area support film and a stack of layers formed in situ on the wide area support film. The stack defines pixel electrode arrays for a plurality of LC cells, and electrical circuitry for each LC cell for independently addressing each pixel electrode via conductors beyond the edge of the respective pixel electrode array. In this example, the area occupied by the pixel electrode array for a LC cell is the active area (AA) of the LC cell.

Figure 2:
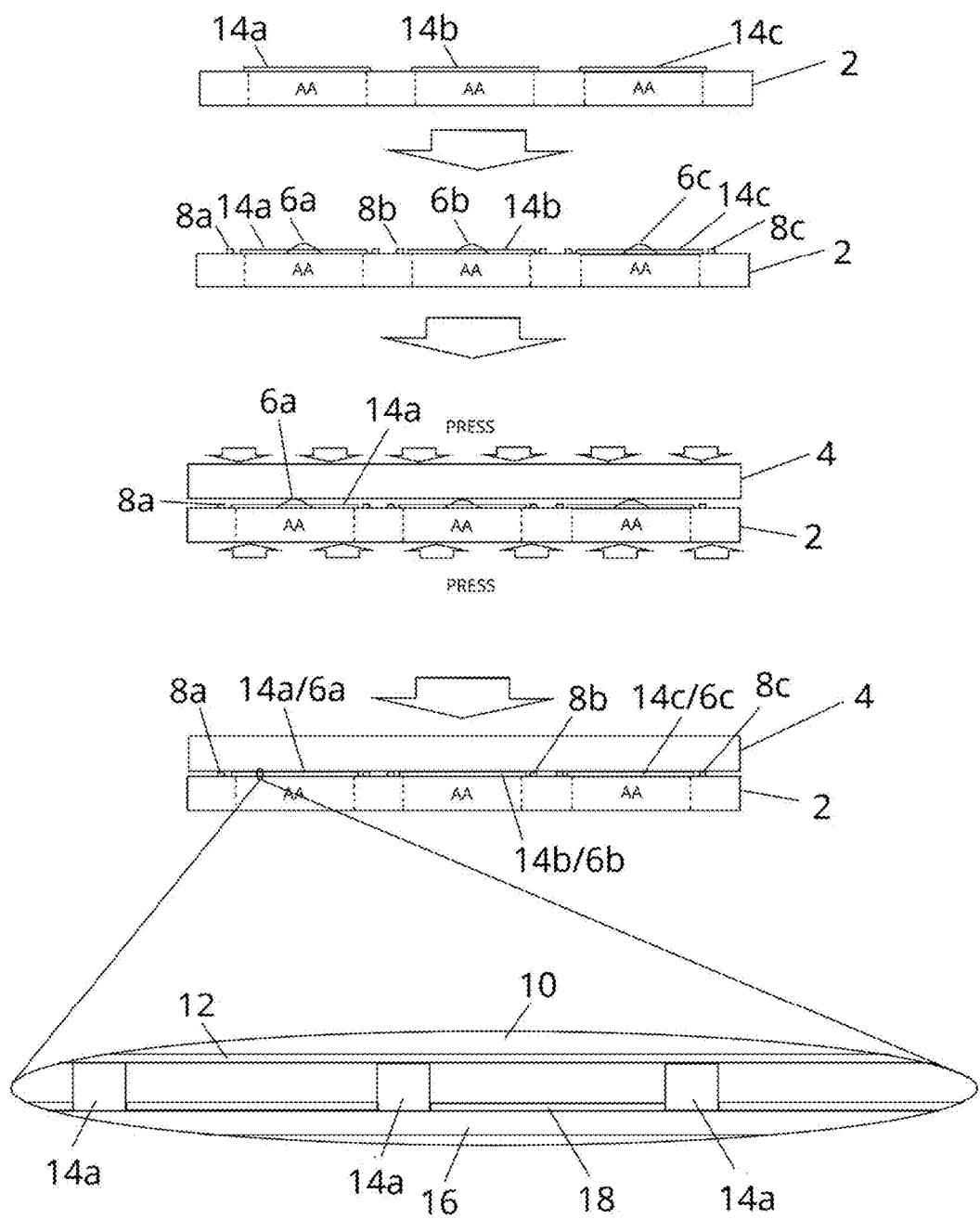
FIG. 2 illustrates later stages of the method of FIG. 1.

In this example, the mother component 2 provides half-cells for twelve LC cells, but only three of the twelve half-cells are shown in FIGS. 1 and 2.

In this example, the support film is a sub-100 micron thickness plastics film such as a cellulose triacetate (TAC) film; and the electrical circuitry for independently controlling the electrical potential at each pixel electrode via conductors outside the active area of the display device is active matrix circuitry. For each LC cell, the stack defines a respective thin-film-transistor (TFT) for each pixel electrode. The stack defines a source-drain conductor pattern and a gate conductor pattern for each LC cell. The source conductor pattern for a LC cell defines: (i) an array of source conductors each providing the source electrode for a respective row of TFTs, and each extending to outside the active display area; and (ii) an array of drain conductors each in contact with a respective pixel electrode. The gate conductor pattern for a LC cell defines an array of gate conductors each providing the gate electrodes for a respective column of TFTs, and each extending to outside the active display area. The terms "row" and "column" together indicate any pair of substantially orthogonal relative directions. Each pixel electrode is associated with a respective unique combination of source and gate conductors, whereby each pixel electrode can be independently addressed via the source and gate conductors.

In this example, the stack includes an organic polymer semiconductor layer formed in situ on the support film by solution processing, which semiconductor layer provides the semiconductor channels for the above-mentioned TFTs. The stack also includes organic polymer insulator/dielectric layers also formed in situ on the support film by solution processing.

The production of this mother component 2 is designed to produce identical pixel electrode arrays and identical electrical circuitry for each of the twelve LC cells.

In this example, the formation of the layer of spacer structure material 14 in situ on the mother component 2 comprises depositing a film of a solution of spacer structure material on the uppermost isolation layer 16 of the above-mentioned stack, by a liquid processing technique such as, e.g., spin-coating, over the whole upper surface of the mother component 2. In this example, the spacer structure material is an organic polymer material (e.g., photoresist material) whose solubility in a developer solvent can be changed by exposure to radiation. The layer 14 of spacer structure material is exposed to a radiation image (negative or positive, depending on the type of photoresist material used for the spacer structure material) of the pattern desired for the array of spacer structures 14, using a simple binary photomask, at a radiation frequency that induces a change in the solubility of the spacer structure material. The resulting latent solubility image is then developed using the above-mentioned developer solvent, to produce respective arrays of spacer structures 14a, 14b, 14c for the twelve LC cells. The location of each spacer structure 14 relative to the underlying electrical circuitry is controllable by controlling the position of the above-mentioned photomask with reference to alignment marks defined by one or more conductor patterns within the stack.

There is no difference between the twelve LC cells in terms of the way the spacer structure material layer is formed or patterned—the aim is to produce identical arrays of spacer structures with identical properties for all of the twelve cells. However, as mentioned above, the inventor for the present application has identified defects in the product LC cells that the inventor ascribes to unintended variations in the properties of the spacer structures across the area of the wide area mother component 2.

In this example, the uppermost isolation layer 16 on which the spacer structures are formed comprises the same photoresist material as that used for the spacer structures. The whole of the uppermost isolation layer 16 has been rendered, by flood radiation exposure, insoluble in the solvent used to deposit the spacer structure material layer 14.

In this example, a liquid crystal alignment surface is provided for each LC cell by a technique comprising: forming a layer of polyimide material 18 in situ on the mother component 2 after formation of the array of spacer structures 14, and subjecting the resulting upper surface of the workpiece to a rubbing treatment that produces micro-grooves in the exposed surface of the polyimide layer 18. Another example of a technique for producing a LC alignment surface is a photoalignment technique using irradiation instead of mechanical means to achieve a surface that controls the alignment of the LC material.

Figure 3:
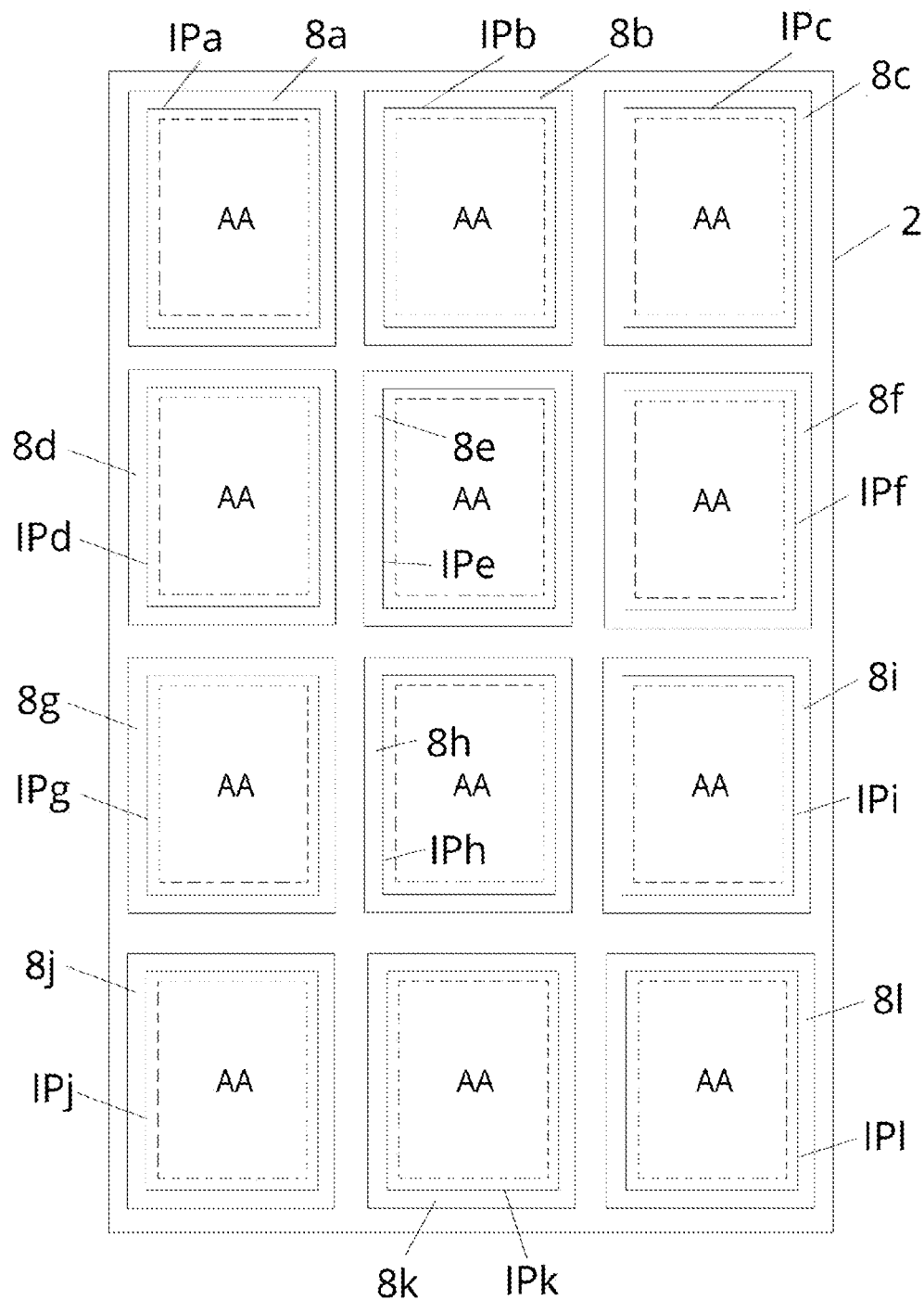
FIG. 3 further illustrates a component shown in FIG. 2.
Figure 4:
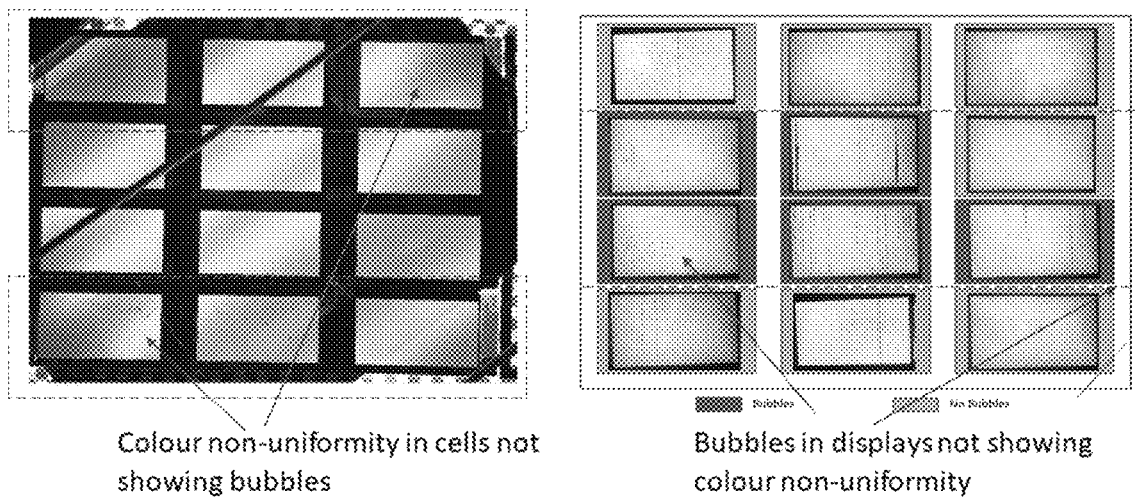

With reference to FIGS. 2 and 3, curable sealant material 8a-8l is dispensed onto the mother component 2 in respective sealant deposition areas 8a-8l completely around the respective active areas of the LC cells. With reference to FIG. 2, drops of LC material 6a, 6b, 6c are dispensed onto the mother component 2 in the active areas AA of the LC cells. In this example, a single drop of LC material is dispensed for each LC cell. The dispensing of the drops of LC material is automated using a dispensing machine that does not make any distinction between each LC cell. The LC material dispensing machine is configured to dispense the same volume of LC material for each LC cell. As mentioned above, the sealant material 8a-8l is deposited completely around the active area AA of each LC cell in a respective sealant deposition area 8a-8l. The sealant 8a-8l may be spread out from these sealant deposition areas during the mother component assembly (LC cell assembly) process described below, but the extent of such spread of the sealant is expected to be substantially the same for all LC cells. After mother component assembly (cell assembly) described below, the sealant material 8a-8l interfaces with the LC material in the completed LC cells, and prevents lateral spread of the LC material beyond the inner perimeter IP (the sealant limits the extent to which LC material 6 can spread laterally). The dispensing of the curable sealant material 8a-8l is also automated, but the sealant dispensing machine is set up so as to produce differences between at least two LC cells in terms of the inner perimeter size (area bound by the inner perimeter IPa-IPl) of the sealant deposition areas 8a-8l. This aspect of the set-up of the sealant dispensing machine is determined based on test observations of the variation in properties (pre-compression thickness, elasticity) of the spacer structures 14 across the area of the mother component 2, and compensates for these variations in properties of the spacer structures 14 by adjustments to the area over which the LC material can spread. In this example, localised measurements of the height of the spacer structures 14 (i.e., the height of the spacer structure layer after patterning to define the spacer structures 14) are made (using 3D microscopy or white light interferometry) at a plurality of points across the area of the mother component 2, for one or more test runs following the process to be used in mass production. A prediction of the process-characteristic variation in spacer structure height across the mother component is generated from these local measurements. For one or more LC cell areas of the mother component where the height of the spacer structures is predicted (based on the above-mentioned test run measurements) to be smaller than for other LC cell areas of the mother component 2), the inner perimeter IPa-IPl size of the sealant deposition area (8a-8l) is set larger (in proportion to the predicted difference in spacer structure height)) than for said other areas of the mother component 2, to thereby prevent LC overfill in the completed LC cell(s) in those LC cell areas. Similarly, for those LC cell areas of the mother component where the height of the spacer structures 14 is predicted (based on the above-mentioned test run measurements) to be smaller than for other LC cell areas, the inner perimeter IPa-IP1 size of the sealant deposition area (8a-8l) is set smaller (in proportion to the predicted difference in spacer structure height) than for said other LC cell areas of the mother component 2, to thereby prevent LC underfill in the completed LC cell(s)

After dispensing the sealant 8a-8l and the LC material 6a, 6b, 6c, a mother counter component 4 (which provides the counter half cells for all twelve LC cells) is applied to the mother component 2; and the two mother components 2, 4 are pressed together over a relatively short period (typically less than 60 seconds) under vacuum to assemble the LC cells.

This pressing together of the two mother components 2, 4 continues until, e.g., a pressure measurement (or, e.g., a time measurement in the case of a pressing process with a known pressure-time profile) indicates a value calculated to be necessary to further spread the drops of LC material over the respective active areas AA (and bring the LC material 6a, 6b, 6c into contact with the sealant material 8a-81) and fully define the LC fill. The calculation of the final pressure value (i.e. the pressure value at which the pressing is stopped) takes into account the compressibility of the spacer structure material. As mentioned above, this pressing process may also result in some spreading of the sealant material 8a-81 (i.e., some change in the inner perimeter size of the area occupied by the sealant 8a-81), but the degree of spreading is expected to be substantially the same for all LC cells across the whole area of the mother components 2, 4.

With the two mother components 2, 4 thus pressed together under vacuum, curing (partial or complete) of the sealant 8a-81 is carried out by e.g. UV irradiation of the sealant material through the mother components (and the relatively rigid carriers temporarily adhered to the mother components to support the mother components during the production and cell assembly processes). The cured sealant 8a-81 functions to hold the mother components together after the external force pressing the two mother components 2, 4 together is removed.

In this example, the resulting mother component assembly is subjected to a hot press process to release the relatively rigid carriers from the mother component assembly. In this example, this hot press process is carried out in an oven at a temperature above the clearing temperature Tc of the LC material 6a, 6b, 6c, for a duration of about 1 to 120 minutes, In this example, the sealant material 8a-81 additionally includes a thermally curable component (e.g., epoxy component) in addition to the UV-curable component (e.g., acrylic component), and the thermally curable component is cured by the heat of the hot press process. Alternatively, the sealant material 8a-81 includes no thermally curable component, and the sealant material is fully cured by the UV curing process mentioned above.

In this example, the second mother component 4 also comprises a wide area support film (such as, e.g., another sub-100 micron plastics film of, e.g., cellulose triacetate (TAC)) 2, and provides a colour filter array 10 for each LC cell. A liquid crystal alignment surface 12 is also provided at one surface of the second mother component. In this example, this liquid crystal alignment surface is also provided by forming a layer of polyimide material 12 (shown in FIG. 2) in situ on the flexible support film 2 of the second mother component 4 (via the colour filter array 10 of the second mother component 4), and subjecting the surface of the polyimide layer 12 to a mechanical rubbing treatment that produces microgrooves in the exposed surface of the polyimide layer 12.

The liquid crystal alignment surfaces of the two components 2, 4 function to control the orientation of the director of the LC material, in the absence of any overriding electric field generated by an electric potential difference between a pixel electrode and a counter electrode (which counter electrode may or may not be part of the same half-cell as the pixel electrode array, depending on the type of LC cell).

In one example, both the photospacer structures 14 and also the uppermost insulator layer 16 (directly below the photospacer structures 14) comprise cross-linked epoxy-based photoresist known as SU-8.

As mentioned above, an example of a technique according to the present invention has been described in detail above with reference to specific process details, but the technique is more widely applicable within the general teaching of the present application. Additionally, and in accordance with the general teaching of the present invention, a technique according to the present invention may include additional process steps not described above, and/or omit some of the process steps described above.

In addition to any modifications explicitly mentioned above, it will be evident to a person skilled in the art that various other modifications of the described embodiment may be made within the scope of the invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

What is claimed is:

1. A method, comprising:
    forming a layer of spacer structure material in situ on a film component, and patterning the layer of spacer structure material in situ on the film component to define spacer structures for an array of liquid crystal (LC) cells in at least the active areas of the LC cells;
    applying a counter component to the film component, after having dispensed sealant material onto one or more of the two components in respective sealant deposition areas around each active area of the array of LC cells, and after having dispensed one or more drops of LC material onto one or more of the two components in each active area of the array of LC cells;
    pressing the two components together so as to spread the drops of LC material over the active areas;
        wherein, after pressing, the sealant material for each LC cell interfaces with the LC material for the respective LC cell; and
        wherein each of the sealant deposition areas has a respective inner perimeter and an inner perimeter size, bound by the respective inner perimeter, and the method further comprises controllably varying the inner perimeter size across the array of LC cells, so as to compensate for variations in one or more properties of the spacer structures across the array of LC cells.

2. The method according to claim 1, comprising:
    predicting variations in the one or more properties of the spacer structures based on spacer structure measurements in one or more production tests; and
        wherein controllably varying the inner perimeter size across the array of LC cells is based on the predicted variations.

3. The method according to claim 1, wherein the one or more properties of the spacer structures comprises the height of the spacer structures.

* * * * *